July 8, 1969   E. J. GIGLIO   3,453,998
EYE MEASURING INSTRUMENT
Filed March 8, 1967
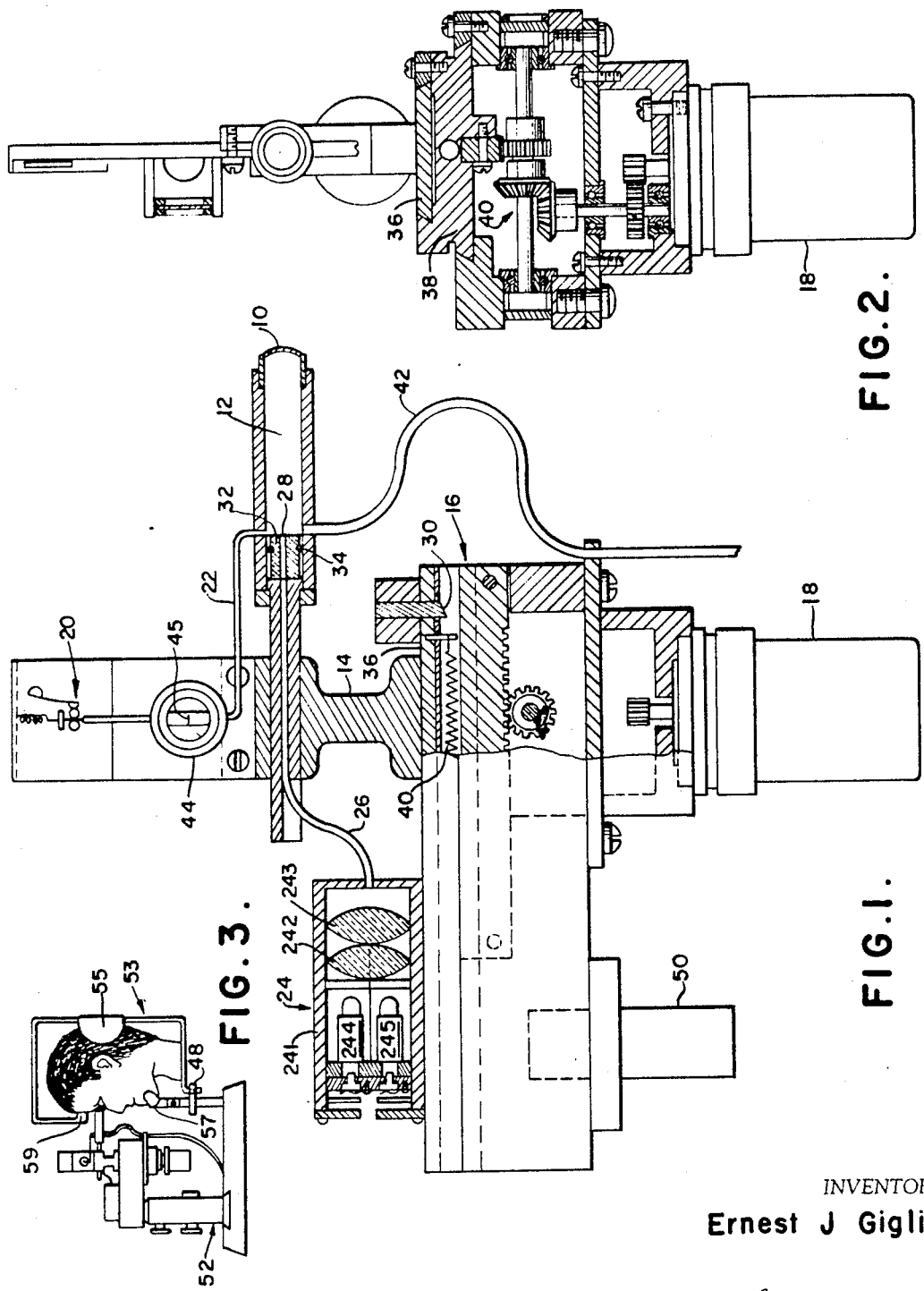
INVENTOR
Ernest J Giglio
BY Alvin Browdy
ATTORNEY United States Patent Office 3,453,998
Patented July 8, 1969

3,453,998
EYE MEASURING INSTRUMENT
Ernest J. Giglio, Bernardsville, N.J., assignor to the United States of America as represented by the Secretary of the Department of Health, Education, and Welfare
Filed Mar. 8, 1967, Ser. No. 621,610
Int. Cl. A61b 5/10, 10/00, 3/16
U.S. Cl. 128—2                 9 Claims

ABSTRACT OF THE DISCLOSURE

The device relates to the measurement of intra-ocular distances using ultrasonics and employs a device for automatically carrying the measuring instrument to the eye and quickly withdrawing the instrument within the normal blink reflex time of approximately 0.1 second. The device utilizes a continuous liquid medium between the eye contacting element and the ultrasonic measuring device.

The present invention relates to an automatic means for carrying a measuring instrument to the eye and, more particularly, an ultrasonic device for measuring intra-ocular distances utilizing such an automatic carrying means.

In the process of making measurements of intra-ocular distances using ultrasonics, the crystal must be coupled to the eye through a continuous liquid or solid path. Such eye containing probes have, in the prior art, been characteristically hand-held, as are instruments intended to measure the intra-ocular pressure, or if not hand-held they have at least been manually guided. The inaccuracies due to position, lack of uniform pressure, and tremor from hand application have been long recognized but until the present time no way has been devised to obviate these serious disadvantages. Thus, Baum ("A Critique of Time-Amplitude Ultrasonography," Arch. Ophthal., vol. 65, 1961, p. 353) and Purnell et al. ("An Evaluation of Time-Amplitude Sonography in Ocular Diagnosis," American Journal of Ophthalmology, vol. 54, 1962, p. 1103) have reported that changes of 0.5 millimeter of lateral displacement or 0.5° change of angular orientation, in the vicinity of the optic axis produces marked changes in the time-amplitude display of echoes from the eye.

Others have proposed systems which in part attempt to eliminate the inaccuracies introduced by hand-held or guided ocular probes and these include the ultrasonic application of the electronic technique known as "B-Scan" utilized by Baum ("The Application of Ultrasonic Locating Techniques to Ophthalmology," Archives of Ophthalmology, 1958, vol. 60, pp. 263–279) and Kossoff et al. "The C. A. L. Ophthalmological Echoscope," Wissenschafliche Zeitschrift der Humbolt-Universitaet zu Bernia; Mathmatisch-Naturwissenschofliche Reihe, 1965, volume 14 (1), pp. 39–43). Other systems include that of Nover and Grote ("Uber die Bestimmung der Achienlange des Menschlichen Auges mit Utraschall am Lebenden," Albrecht V. Graefes Archiv Ophthalmologie) which requires the patient to be in the prone position and utilizes a water-filled rubber dam around the eye, and the method of Leary et al. ("Ultrasonographic Measurement of the Components of Ocular Refraction in Life. I Technical Considerations," Vision Research, 1963, vol. 3, pp. 489–498) which requires that the patient hold his eye, previously anesthetized, against the probe. These systems have not been entirely satisfactory both because a number of inaccuracies may be introduced into the measurements and the procedures are uncomfortable, difficult and time consuming for the patient.

It is therefore an object of the present invention to overcome the deficiencies of the prior art, such as those indicated above.

It is another object of the present invention to provide a device for making intra-ocular measurements, utilizing ultrasonics, within the blink reflex time so that no topical anesthetic is needed.

It is another object of the present invention to provide a device for automatically carrying a measuring instrument to the eye and quickly withdrawing same.

It is another object of the present invention to provide for reliable and valid ultrasound intra-ocular determinations.

It is another object of the present invention to provide a device which may be applied to the eyes of younger children.

It is another object of the present invention to provide greater patient comfort during eye measurement and to provide eye measurements without the use of anesthetics which may distort the measurement.

It is another object of the present invention to provide an automatic carrying device which senses when the eye is touched.

It is another object of the present invention to provide an automatic carrying device which limits overtravel toward the eye by a fixed amount.

It is another object of the present invention to provide an eye-instrument carrying device which will accomplish its round trip toward and away from the eye within the blink reflex time of approximately 0.1 second and which will control the dwell time of the probe against the eye to allow sufficient time for an eye measurement to be made.

These and other objects and the nature and advantages of the present invention will become more apparent with the following detailed description taken in conjunction with the drawing wherein:

FIG. 1 is a side elevation, partly in section, of a device in accordance with the present invention;

FIG. 2 is a front elevation, partly in section, of the device of FIG. 1; and

FIG. 3 is a side elevation, showing the apparatus in use.

Broadly, the device of the present invention includes an eye contact element or probe 10 which forms the front wall of a reservoir 12 which contains a liquid of an hydraulic medium, such as water, which is transparent and, preferably, electrically conductive for purposes described below. The reservoir 12 and the probe 10 are supported by suitable supporting structure 14 on a suitable sliding mechanism shown generally at 16.

A tubing 42 is attached to the lower side of the reservoir 12 and is used for filling the reservoir with the liquid medium, such as water. As the reservoir 12 is filled, the liquid rises into the small diameter tubing 22, such as one having a 0.28 millimeter inner diameter, and its level is adjusted with the aid of a magnifier 44 at the level 45. The supply is then clamped off so that any displacement will be into the upper tubing 22.

The movement of the probe 10 (and the reservoir 12 and the support 14 therewith) in a straight line is effected by a suitable motor 18 which is capable of moving the probe toward the eye at an initially high rate of speed and then at a slower rate as the probe approaches the eye and is then capable of stopping the probe as it contacts the eye and then moving the probe away from the eye, all within 0.1 second. Preferably, the motor 18 is a servo-motor, which can be programmed to drive the probe as indicated above, and which includes a dry magnetic particle clutch for quickly stopping the movement toward the eye. Servo-motors of this type are known. Solenoids may also be used to control the movement if desired.

The motor 18 is controlled by a sensing and switching mechanism which determines when the probe 10 touches the eye. The preferred sensing means includes a pair of spaced platinum electrodes 20 and the small diameter tubing 22 passing upwardly from the reservoir 12 to the space between the electrodes. The upwardly extending tubing 22 preferably has a ratio of diameters of 1:50 with the reservoir 12. When the probe 10 contacts the eye, the probe 10 is displaced into the reservoir 12 which effects displacement of the liquid into the tubing and causes a rise in the conductive liquid within the tubing 22 so that the conductive liquid fills the space between the platinum electrodes and closes the circuit to reverse the servo-motor 18.

An alternate system (not illustrated) for sensing contact of the probe with the eye and for switching the motor 18 involves the use of a conductive probe, such as a metalized plastic film, and includes the patient in the sensing circuit.

An important feature of the present invention comprises a suitable means to permit the proper alignment of the probe in front of the patient's eye. This means preferably comprises a source of light shown generally at 24 and a means, preferably a 1 millimeter diameter fiber optic 26, for transmitting the light to a location of very small diameter 28 behind the transparent probe 10.

With such a general description of the device in mind, its use may be generally understood as follows: The patient's cooperation is necessary to the extent that he is required to look in the direction of the small point of light at area 28 transmitted by the fiber optic 26 from the light source 24 and observed through the transparent probe 10 and the liquid medium in the reservoir 12. The light may be changed in color by the operator at the light source 24 as described in greater detail below. The 1 millimeter fiber optic ending at area 28 subtends an angle of about 1° at the anterior nodal point, just prior to contact of the probe 10 to the eye.

After coarse adjustments made by means of a supporting base 52 capable of lateral, vertical and forward and aft adjustment, described in greater detail below, along with or in place of similar adjustments of the patient's head rest 53, also described below, the probe 10 is positioned just beyod the patient's eyelashes, i.e. from ⅜ to ½ inch from the eye. When the operator presses a switch, the probe 10 is carried forward until it lightly touches the patient's eye. The preset pressure switch, such as the thin diameter tubing 22 and the spaced electrodes 20, thereupon causes the retraction of the probe to its original position. This movement all occurs within 0.1 second, the normal blink reflex time, and therefore a topical anesthetic or a speculum is not necessary; these would normally provide undesirable edematous effects, distortions in the measurements and discomfort to the patient.

Two additional controls are provided for the safety of the patient. As indicated above, the cornea is initially prepositioned at a fixed distance from the probe 10 and a microswitch may be provided to limit travel beyond this point; also, or in place thereof, a fixed stop, such as the stop 30 in FIG. 1, prevents the probe from moving too far. The operator monitoring the operation can also withdraw the probe as he would, for instance, in applanation tonometry.

The probe 10, reservoir 12 and the support 14 are all preferably mounted on a first slide 36 which in turn is mounted on a second slide 38. These slides are driven by the motor 18 through suitable gearing arrangement shown generally at 40. When the circuit is closed at switch 20 by the displacement of water in the tubing 22 to the space between the electrodes 20, the motor is both reversed and the upper slide 36, spring biased by a spring 40, is triggered to release so that the spring immediately pulls the upper slide 36 back away from the eye. The time constants of the servo-motor limits overtravel to 0.001 inch and the stop 30 also prevents excessive overtravel. The servo-motor 18 is programmed for a fast start, slowing during the latter portion of forward travel, and making a very rapid reverse. This action is obtained by a voltage change to the motor which is connected to a cam operative linear potentiometer. The signal from the switch 20 is fed to a power amplifier and then to both the motor for reversal, and the trigger for the release of the top slide. The servo-motor preferably incorporates a dry magnetic particle clutch which can reduce the reversal time at full speed to 0.2 millisecond. As pointed out above, such servo-motors and also magnetic dry particle clutches are known per se in the prior art.

As is known, the ultrasonic readings appear on an oscilloscope. However, because of the very short residence time of the probe on the eye, it is necessary to photograph the oscilloscope pattern and, accordingly, an electric oscilloscope camera is provided, the shutter of which is triggered either during the forward travel of the probe or by the switch 20. Photographs can be made of the display on the face of the oscilloscope in less than 10 milliseconds.

Referring again to FIG. 1, the probe 10 preferably comprises a thin plastic film, preferably Mylar (polyethylene terephthalate), preferably about 0.1 mil thickness, which is caused to budge slightly outwardly toward the eye due to the weight of the water therebehind in the reservoir 12. The light 28 passes through the crystal transducer 32 which is annular to the end of the fiber optic or is placed in front of the fiber optic. The crystal transducer 32 projects into the liquid reservoir 12 and is spaced from the side walls thereof by an annular O-ring seal 34.

The light source 24 includes a suitable casing 241, a pair of lenses 242 and 243 and a plurality of colored light bulbs 244 and 245. Iit is preferred to have a triple light source although only two bulbs are illustrated. The particular colored light source can be selected at the will of the operator through suitable switches (not shown).

The light source provides a continual check on fixation by the patient. The position of the fiber optic 26 and the dimensions of the reservoir 12 insures probe placement within 1° of the visual axis. The companion eye preferably views a drawing placed in a Badal type optometer in which the fixation light becomes an integral part of the view of the optometer; for instance, in the case of a child, the fixation light may be part of an animal's eye. The reported clearness of the picture and the setting of the instrument provides a measure of control of accommodation.

A head support 53 is provided to maintain the head of the patient in the desired position relative to the probe 10. The head support may be provided with an adjustable base 48 so that the head support can be moved in at least two directions, i.e. height and lateral adjustment, and preferably also for forward and aft travel. A head clamp 55 may be associated with the head support and the patient can then be seated comfortably with his head in a chin rest 57 and brow against a bow rest 59 and his head in clamped position.

The machine is provided with a stud 50 which fits into an instrument supporting base shown generally at 52. As with the adjustable base 48 of the head support 53, the instrument base 52 is capable of lateral and forward travel as well as height adjustment. Manipulation of the base 52 enables the operator to position the instrument directly in front of the patient. If desired, the operator may make his initial adjustment while looking through a small telescope arranged to allow a simultaneous fix for forward and height adjustment in front of the person to be measured. Lateral adjustment is secured by report that the subject sees the light through the fiber optic 26.

The doctor is able to change the colors seen by the patient as indicated above, and he accordingly adjusts the optometer so as to place the light in its proper place in the field. When the instrument and patient are in proper adjustment, the doctor waits for a normal blink and then depresses an activator switch immediately following the blink. The servo-motor then carries the device forward rapidly at first, then slowly near its anticipated end of forward travel. As the probe 10 touches the eye, the ultrasonic measurement is taken by the transducer and the measurement appears on the oscilloscope and is recorded by the camera.

The device in accordance with the present invention has a number of significant characteristics:

(1) It is capable of sensing when the eye is touched;

(2) The amount of overtravel is limited by a fixed, amount, preferably 1 mil;

(3) The machine is able to accomplish its round trip toward and away from the eye within the time required by the upper lid to descend over the eye and meet the lower lid, i.e. approximately 0.1 second;

(4) The dwell time in contact with the eye is controlled and is maintained for a sufficient amount of time to obtain the desired measurement.

The device obviates the difficulties introduced by hand-held probes; in addition, it provides for accurate alignment of the eye with the probe and provides for an accurate measurement with a minimum of the patient's time.

It will be obvious to those skilled in the art that various changes may be made without departing from the scope of the invention and the invention is not to be considered limited to what is shown in the drawings and described in the specification.

What is claimed is:

1. A device for automatically carrying a measuring instrument to the eye and quickly withdrawing same comprising:

an eye contact element comprising a very thin, transparent plastic film;

means for moving said film toward the eye at an initially high rate of speed and then at a slower rate as the film approaches the eye, for stopping said film as it contacts the eye, and for moving said film away from the eye within 0.1 second of said stopping;

sensing and electrical switching means for sensing said film contact with the eye and for switching said moving means to effect first said stopping and then said moving of the film away from the eye; and means to permit the proper alignment of said thin, transparent plastic film in front of the eye comprising a source of light and means to transmit said light to a location of very small diameter behind said transparent plastic film.

2. A device for making intra-ocular measurements by the utilization of ultrasonics within the normal blink reflex time of 0.1 second comprising:

the device of claim 1 for automatically carrying said eye contact element to the eye and quickly withdrawing same;

a liquid reservoir with said plastic film forming one wall thereof;

a liquid medium disposed in said liquid reservoir and behind said thin plastic film and in hydraulic contact therewith; and an ultrasonic measuring device including a transducer in hydraulic contact with said plastic film, whereby ultrasonic measurement of intra-ocular dimensions may be effected through said liquid medium and said plastic film as said film contacts the eye for 0.1 second.

3. A device in accordance with claim 1 further comprising an electrically conductive and transparent hydraulic medium behind said film causing said film to bulge out slightly, and wherein said sensing and electrical switching means comprises a pair of spaced electrodes and a thin tubing passing upwardly from said hydraulic medium behind said film to a location between said two electrodes so that the contact of said film with the eye causes an inward movement of the hydraulic medium with a consequent rising of said medium in said thin tubing to said location between said electrodes to close a circuit therebetween.

4. A device in accordance with claim 3 wherein said thin film comprises polyethylene-terephthalate film of 0.1 mil thickness.

5. A device in accordance with claim 1 further comprising means to support the head of the patient so that the eye is located ⅜" to ½" in front of said plastic film at rest, and a physical stopping means to limit overtravel of said film beyond the initial contact point of the eye to 1 mil.

6. A device in accordance with claim 5 further comprising means to adjust said head supporting means in at least two planes.

7. A device in accordance with claim 5 further comprising a machine support means, said machine support means including means to adjust the position of said plastic film in three planes.

8. A device in accordance with claim 7 wherein said light transmitting means in said means to permit proper alignment comprises a fiber optic of approximately 1 mm. diameter.

9. A device in accordance with claim 1 wherein said means for moving said film and stopping said film and reversing said film travel comprises a reversible electric servo-motor including a dry magnetic particle clutch.

References Cited

UNITED STATES PATENTS

| | | | |
|---|---|---|---|
| 2,708,928 | 5/1955 | Zenatti | 73—80 XR |
| 2,836,173 | 5/1958 | Uemura et al. | 128—2.05 |
| 3,272,001 | 9/1966 | Adise | 73—80 |

L. W. TRAPP, *Primary Examiner.*

U.S. Cl. X.R.

73—80